INVENTOR.
RICHARD THOMAS
BY Edward C Healy
ATTORNEY.

Sept. 7, 1943.  R. THOMAS  2,328,861

PRINTING MACHINE

Filed Feb. 26, 1940  7 Sheets-Sheet 6

INVENTOR.
RICHARD THOMAS
BY Edward C Healy
ATTORNEY.

Sept. 7, 1943.   R. THOMAS   2,328,861
PRINTING MACHINE
Filed Feb. 26, 1940   7 Sheets-Sheet 7

INVENTOR.
RICHARD THOMAS
BY Edward C. Healy
ATTORNEY.

Patented Sept. 7, 1943

2,328,861

UNITED STATES PATENT OFFICE 2,328,861

PRINTING MACHINE

Richard Thomas, San Francisco, Calif.

Application February 26, 1940, Serial No. 320,979

1 Claim. (Cl. 101—102)

This invention relates to improvements in adding machines and has particular reference to a portable adding machine which may be carried about by a clerk in a store to compute a sale or a combination of sales made by the clerk at the counter without the use of a fixed adding machine at a remote point.

The principal object of the invention is to provide a small convenient adding device which may be utilized in stores by clerks to instantly complete sales made by the said clerks, which device will automatically eject a listing tape showing the sale or sales and the total amount of said sales.

Another object of the invention is to provide an adding machine of the class set forth which includes price wheels to list a single sale and also wheels interconnected to list the total amount of sales registered by the device.

A further object of the invention is to provide an adding machine which includes a rotary ribbon arranged in close proximity to the price wheels and which is operated by eccentric means and is also associated with a continuous listing tape, which tape, when actuated by the eccentrics, presses against the price wheels and registers the transaction made.

A further object of the invention is to provide means for simultaneously releasing the recording tape, moving the recording ribbon and the listing tape.

A still further object of the invention is to provide a handy adding device of the class set forth which is extremely simple in construction, which may be readily handled by a clerk, and which will enable the clerk to compute all sales made at a local counter in any store.

It is a well-known fact that various devices have been utilized for listing and recording figures, but these, as a general rule, are cumbersome devices requiring a multiplicity of gears and counter wheels and also a plurality of keys for the operation of these wheels.

It is, therefore, the further object of my invention to simplify a device of this character and to greatly reduce the size of the same so that it may be easily transported or carried by a clerk in a store for instant use.

Other objects and advantages will be apparent during the course of the following description.

In the accompanying drawings forming a part of this specification and in which like numerals are employed to designate like parts throughout the same.

Figure 1:
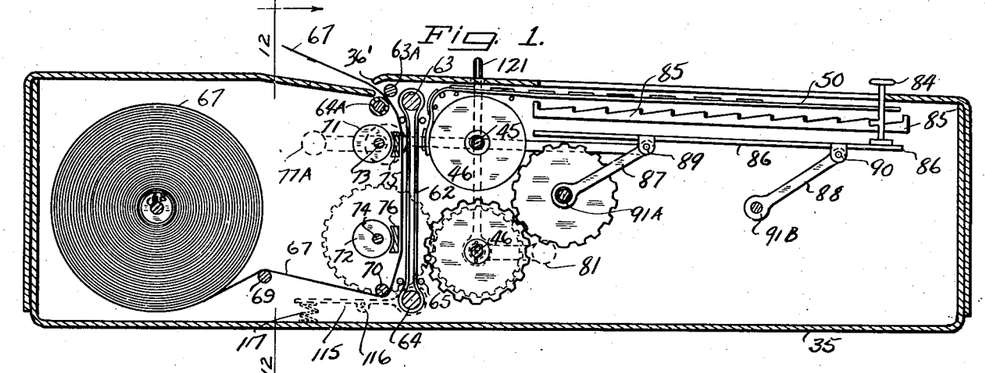
Fig. 1 is an enlarged vertical longitudinal sectional view taken through the extreme left side of the casing and showing the listing tape dispensing means, the ribbon, the vertical arrangement of the unit and total price wheels, the eccentric members that are provided to press the tape and ribbon against the price wheels, and the means for manually operating the price wheels to bring the numerals thereon that indicate the prices into their relative positions where the prices can be listed.
Figure 3:
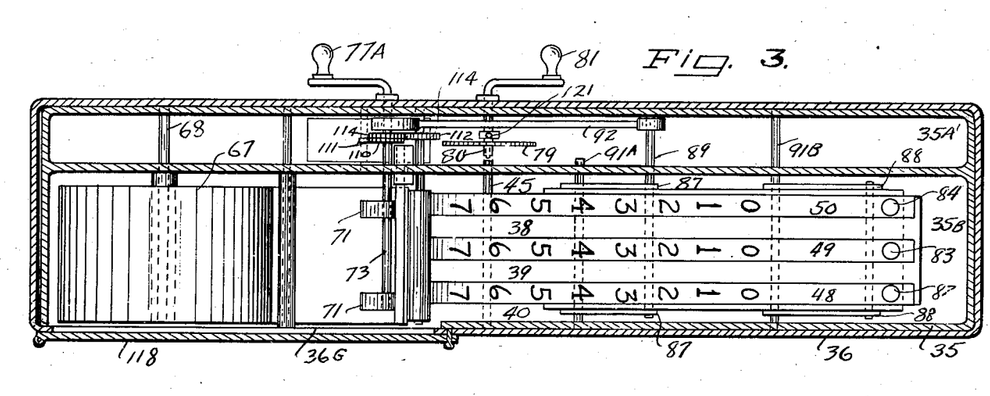
Fig. 3 is a plan section of the device as shown in Fig. 2, further illustrating the operative structure of the invention.
Figure 4:
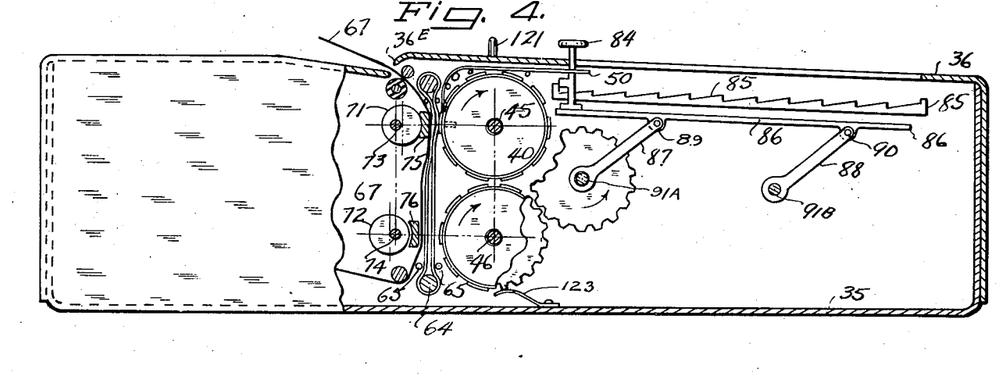
Fig. 4 is a partial sectional view showing some of the cooperative elements and particularly showing one of the eccentrics pressing the listing paper and recording ribbon against one of the price wheels.

In the accompanying drawings wherein for the purpose of illustration is shown a preferred embodiment of my invention, the numeral 35 designates an oblong rectangular casing that is preferably made of metal and is provided with two oblong compartments 35A and 35B, as shown in Fig. 3; while the numeral 36 designates a suitable cover, as shown in Fig. 1. The numerals 36A, 36B, and 36C designate a series of longitudinal slots formed in the top face of the cover to provide means for permitting the price recording tapes within the casing to be actuated. The numeral 36' indicates a slot that is formed transversely through the top of the cover to enable one end portion of the listing tape to extend longitudinally out of the casing and through the cover, as shown in Figs. 1 and 4. A small portion of the cover adjacent each side of the slot 36' is preferably formed downwardly, as illustrated, to permit the listing tape to be projected through said slot at an oblique angle.

Figure 25:
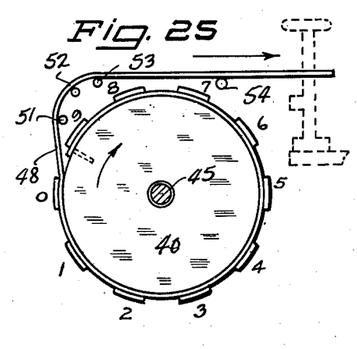
Fig. 25 is an enlarged side elevational view of one of the unit price wheels and price recording tape that is adapted to be wound and unwound on the outer periphery of said wheel.

Any suitable means may be provided to carry and control the numeral characters required in the device. The preferred construction consists in providing a plurality of wheels 38, 39, and 40, hereinafter termed the unit price wheels, and wheels 41, 42, 43, and 44, hereinafter termed the total price wheels. The said unit price wheels are revolubly mounted on a common shaft 45 that is fixed transversely in the upper portion of the casing, as shown in Figs. 1, 4, 10, and 11. Likewise, the wheels 41, 42, 43, and 44, hereinafter termed the total price wheels, are revolubly mounted on a common shaft 46 that is fixed into the casing and arranged in parallel relation with and underneath the unit price wheel shaft 45. The unit price wheels 38, 39, and 40 are provided, respectively, with price recording tapes 48, 49, and 50. The said tapes may be made from a suitable metallic or refractory material, and all carry numeral characters from naught to nine inclusive that are formed on or otherwise fixed to the top face of each tape. The front ends of the recording tapes 48, 49, and 50 are fastened substantially to the unit price wheels 38, 39, and 40 and are adapted to be wound around said wheels, as shown in Fig. 25, or to be unwound therefrom, as shown in Fig. 1. A plurality of pins 51, 52, 53, and 54 are fixed into the casing 35 and arranged underneath the recording tapes, as shown in Figs. 1 and 25, to cause the tapes to wind and unwind unrestricted and freely on the unit price wheels. The total price wheels 41, 42, 43, and 44 are provided, respectively, with price recording bands 55, 56, 57, and 58, which are fixed onto the outer peripheries of said wheels, said bands being made of any suitable material and carrying the numeral characters from naught to nine inclusive.

Figure 26:
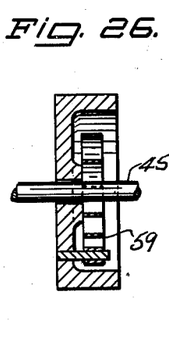
Fig. 26 is an enlarged sectional detail of one of the unit price wheels and the coiled spring that is mounted within the wheel and connected to the wheel shaft and wheel.
Figure 27:
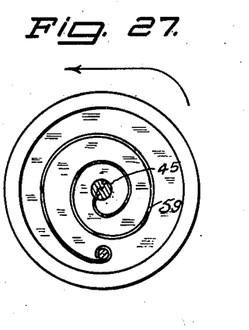
Fig. 27 is an enlarged end detail of one of the unit price wheels and the coiled spring, illustrating how the spring is adapted to resiliently hold the wheel and actuate it in a contraclockwise direction.
Figure 28:
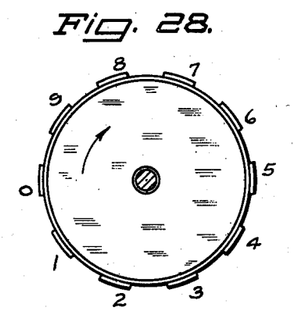
Fig. 28 is an enlarged face view of one of the total price wheels and a price recording tape that is made in the form of a band and substantially mounted on the outer periphery of the wheel.

It will be noted that the unit price wheels are each provided with a coiled spring 59, as shown in Fig. 26, the inner end of which is fastened to the wheel shaft and the outer end to the wheel, as shown in Fig. 27, said springs 59 being capable of revolving the unit price wheels in an anticlockwise direction to retract the recording tapes to their normal position after the price of a sale has been listed.

Figure 29:
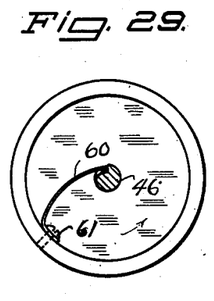
Fig. 29 is a view of one of the total price wheels with the recording band removed and looking at the opposite side of the wheel from that shown in Fig. 28, showing how the wheel is resiliently locked to the shaft in a manner that will permit the wheel to be revolved on the shaft in one direction and linked to the shaft when turned in the opposite direction to enable the total price wheels to be returned to their normal position after a total recording has been made.

The total price wheels are each provided with a curved spring 60 that is mounted within each wheel and fastened thereto by a pin 61, as shown in Fig. 29. The total wheel shaft 46 is formed with a recessed portion, as shown in Fig. 29, which provides a shoulder for engaging with the spring 60 to lock the wheel and shaft together with respect to their turning in one direction but allows the wheel to be revolved on the shaft in the opposite direction. This construction permits all the total price wheels to be returned to their normal position after a total sale price has been listed by simply revolving the total price wheel shaft and also allows each total price wheel to be individually revolved on the wheel shaft when a total sale price is being listed.

In Fig. 1 there is illustrated to advantage a printing or recording ribbon 62 that is preferably made in the form of a band and is arranged within the casing in front of the unit and total price wheels in close proximity thereto and is carried on suitable rollers 63 and 64. A plurality of pins 65 are provided to hold the recording ribbon in its proper position on the rollers. A tape roll 67, mounted in the front end portion of the casing, is carried on a suitable shaft 68. It is to be observed that the said tape is led outwardly over a roller 69 and underneath another roller 70 and adjacent to the recording ribbon 62, and thence upwardly in parallel relation with said ribbon to and between two friction rollers 63 and 64, and thence at an oblique angle through the casing cover 36.

Figure 10:
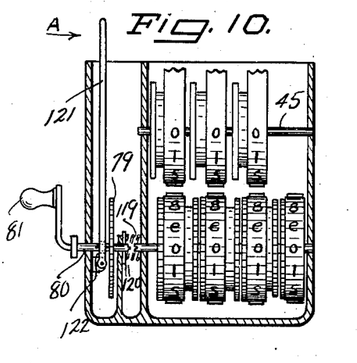
Fig. 10 is a front end assembly view of all the price wheels mounted within the casing and shows the casing in section and the preferred method of supporting the wheels therein.
Figure 11:
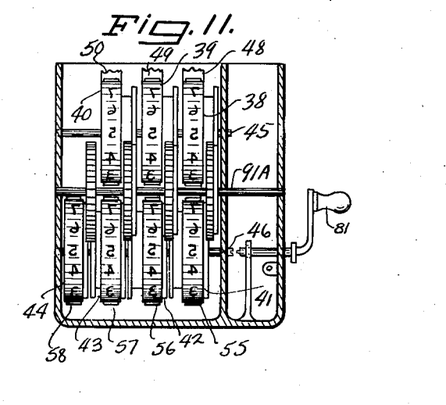
Fig. 11 is a rear end assembly view of all the price wheels mounted within the casing and shows the casing in section and also shows the idler gear assembly that is provided to control the relative positions of the total price wheels with respect to the movement imparted to the unit price wheels.

A preferred means for pressing the tape against the ribbon and price wheels comprises a plurality of eccentric members 71 and 72 that are fixed, respectively, on shafts 73 and 74 and which are revolubly supported in the casing and arranged close to and in parallel relation with the listing tape 67, as shown in Figs. 1, 3, 4, and 12. Two bars 75 and 76 are provided, one of which is arranged between the eccentric members 71 and the tape 67, and the other between the eccentric member 72 and the tape 67. These bars are supported in suitable guides 77 and are resiliently held against the eccentrics by a suitable spring 78, as shown in Figs. 14 and 15. The bars are thus held away from the tape when they are in their normal position but are adapted to be pressed against the tape whenever the eccentrics are operated to record the price of a sale or sales. It will be observed that the eccentric member 71 and the bar 75 are provided to press the tape and recording ribbon against the unit price wheels, while the eccentric member 72 and the bar 76 are provided to press the tape and recording ribbon against the total price wheels. The unit price wheel eccentric shaft 73 extends through the casing and is provided with a handle 77A. The total price wheel eccentric shaft 74 is provided with a gear 78 that is adapted to engage a gear 79 that is fixed on a shaft 80, as shown in Figs. 1 and 10. The said shaft 80 extends through the casings and is provided with a handle 81.

As hereinbefore stated, the unit price wheels are each provided with a price recording tape that carries numeral characters from naught to nine inclusive, and said price wheels are resiliently held in their normal position. A preferred means for controlling said recording tapes to enable different numerals thereon to be listed consists in providing a plurality of specially constructed ratchet pins 82, 83, and 84 that are connected, respectively, to one end of the recording tapes 48, 49, and 50, and in also providing a specially constructed ratchet bar 85 for engagement with said ratchet pins, and another bar or plate 86 that is adapted to be adjustably controlled for supporting the pins, all of which are assembled as shown in Figs. 1, 3, and 4.

Figure 5:
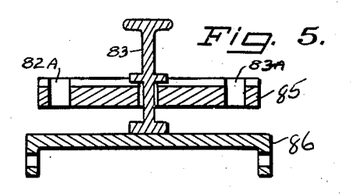
Fig. 5 is an enlarged sectional transverse assembly view of a ratchet bar, ratchet pin and control bar for supporting the pin, all of which are provided to control the longitudinal movements of the unit price recording tapes.
Figure 6:
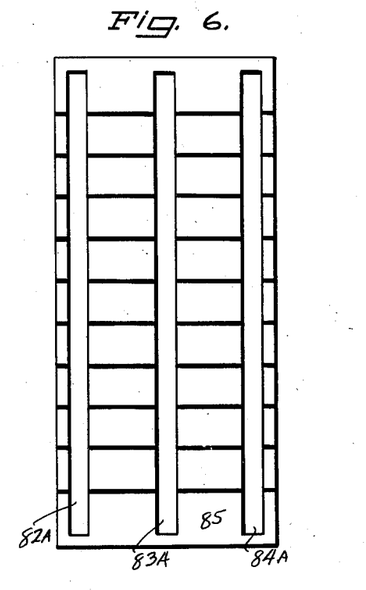
Fig. 6 is an enlarged plan view of the ratchet bar.
Figure 7:
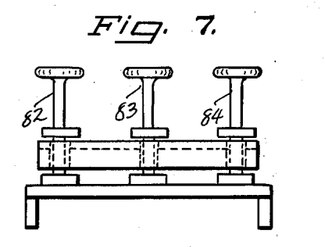
Fig. 7 is an enlarged assembly end view of the ratchet bar, ratchet pin, and pin supporting bar, showing the pin supporting bar in its upper position for enabling the pins to have free movement over the ratchet bar.

Attention is directed to Figs. 5 and 6, which are greatly enlarged views illustrating the preferred construction of the ratchet pins, ratchet bar and the bar for supporting said pins. It will be noted that each ratchet pin 82, 83, and 84 is guided and controlled separately in its respective guideway 82A, 83A, and 84A provided in the ratchet bar 85.

Figure 8:
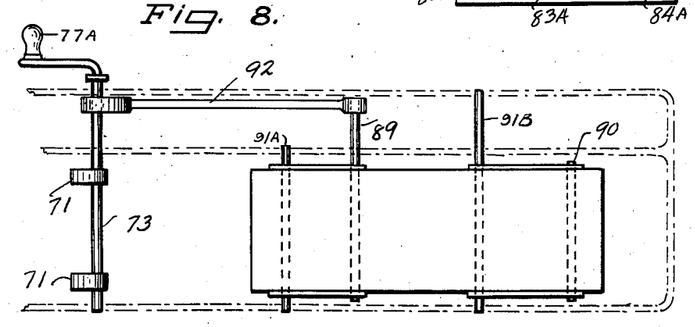
Fig. 8 is a plan view of the pin supporting bar and illustrates how it is connected eccentrically to the eccentric shaft that is provided for pressing the listing paper and recording ribbon against the price wheels.
Figure 9:
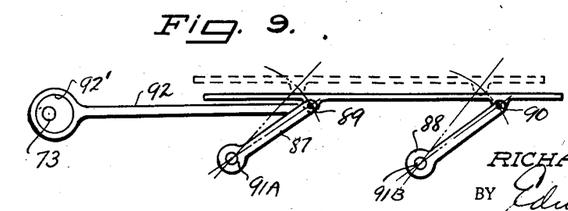
Fig. 9 is a side elevational view of the pin supporting bar and connecting rods that are provided to control the vertical movement of the bar and to hold it in its upper and lower positions.

Figs. 8 and 9 illustrate the preferred means that is provided to control the adjustable bar 86 for releasing the ratchet pin or pins from the outward position so that they may be moved, when the device is being operated, to a position, as shown in Fig. 1, to move the recording tapes outwardly, and will be enabled to return to their normal position, as shown in Fig. 4, after the desired numerals have been recorded. The said bar 86 is supported on a plurality of connecting arms 87 and 88 by being pivotally connected thereto at the outer ends of said arms by shafts 89 and 90, the lower ends of said arms being pivotally connected on shafts 91A and 91B that are arranged transversely underneath the bar 86 and mounted into the walls of the casing 35. An eccentric arm 92 is provided and one end thereof is connected to the shaft 89, and the opposite end is eccentrically connected to the eccentric shaft 73. This eccentric connection 92' is in such relation to the eccentrics on said eccentric shaft as to cause the bar 86 to automatically raise during the turning of the eccentric shaft 73 after the eccentrics have pressed the tabulation paper and the recording ribbon against the price wheels, causing the ratchet pins and price tapes to be released and returned to their normal position, after which a continued turning of said eccentric shaft will automatically lower the bar 86 back to its normal position and to where the device will be ready for the next operation.

From the foregoing, it will be readily observed that when it is desired to record the sale price of an article, it is only necessary to pull the ratchet pins back to a position indicating the sale price corresponding with that indicated on the casing. The said numerals indicated on the casing at the left side of the pins are the numerals that will be recorded, due to the fact that the numeral characters on the unit price tapes are arranged thereon in such relation to the numerals on the casing opposite said price tapes respective slots that when the ratchet pin on a certain tape is moved to a certain numeral, indicated on the casing, the corresponding numeral on the price tape will be moved to the exact required position on the unit price wheel to enable the particular numeral to be printed on the listing tape.

Figure 21:
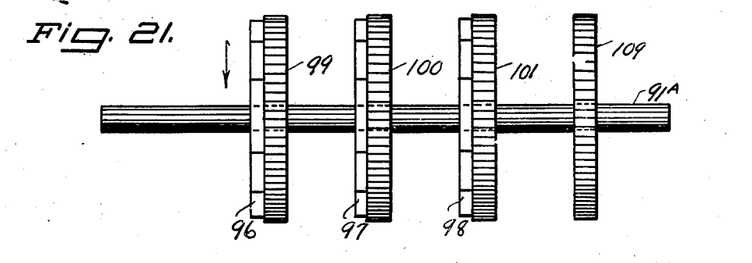
Fig. 21 is an enlarged longitudinal assembly view of the idler shaft and idler gears and ratchet wheels and illustrates their relative locations.
Figure 22:
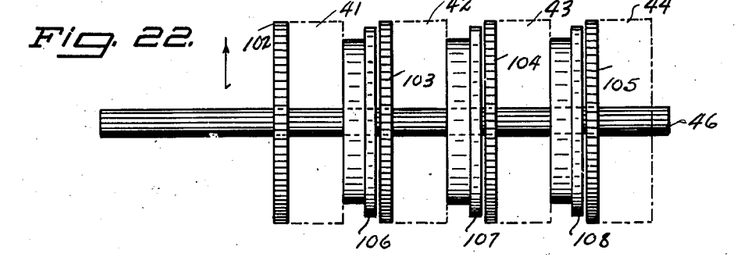
Fig. 22 is an enlarged longitudinal assembly view of the total price wheel shaft and gear wheels that are provided to relatively operate and control the total price wheels.

In Figs. 16, 17, 18, and 19 there is illustrated a specially constructed mechanism for automatically controlling the relative printing positions of the total price wheels with respect to the total amounts that have been tabulated by the unit price wheels so that the total sum of all the sales will appear on the listing paper ribbon as well as the unit prices of the sales. The arrangement of the said mechanism on their respective shafts is best illustrated in Figs. 20, 21, and 22.

Figure 16:
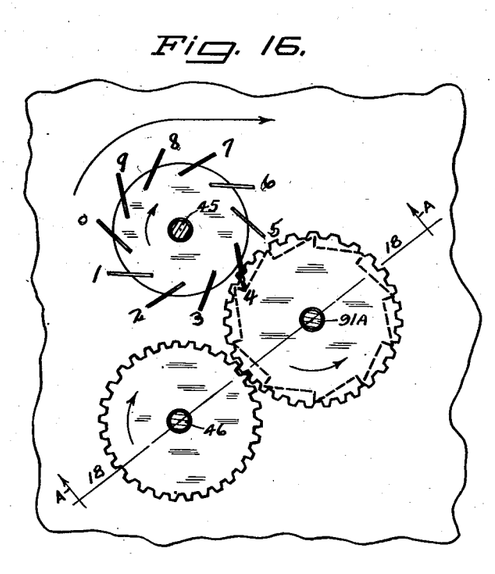
Fig. 16 is an enlarged assembly view, looking from the left side of the casing of an especially constructed gear and ratchet wheel driving mechanism that is provided for operating and controlling the total price wheels.
Figure 17:
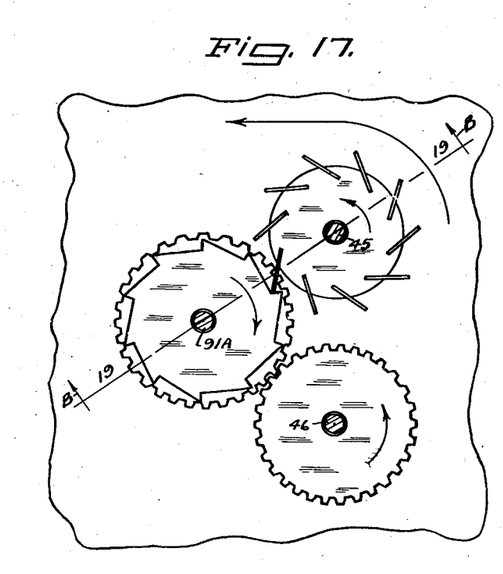
Fig. 17 is a view of the price wheel driving mechanism similar to Fig. 16, except being shown looking from the right-hand side of the device where the handles are located.
Figure 18:
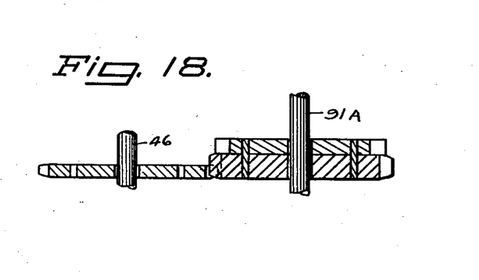
Fig. 18 is a sectional view taken on the line 18—18 of Fig. 16, looking in the direction of arrows A—A.
Figure 19:
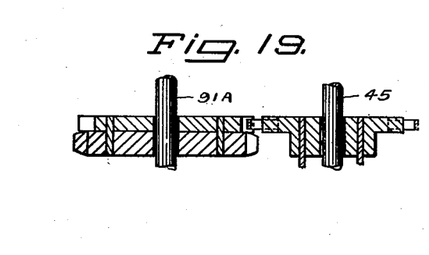
Fig. 19 is a sectional view taken on the line 19—19 of Fig. 17, looking in the direction of arrows B—B.
Figure 20:
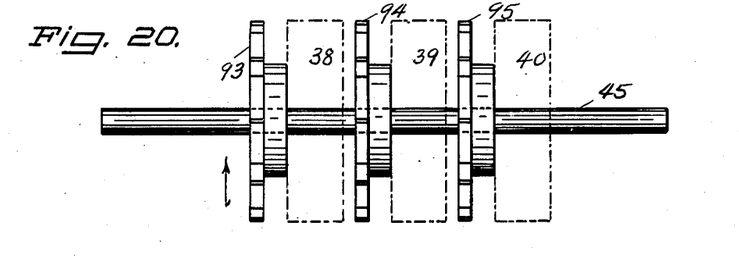
Fig. 20 is an enlarged longitudinal assembly view of the unit price wheel shaft and the ratchet wheel driving members, illustrating the locations of the price wheels and said driving members that are connected to the price wheels and loosely mounted on the shaft.
Figure 23:
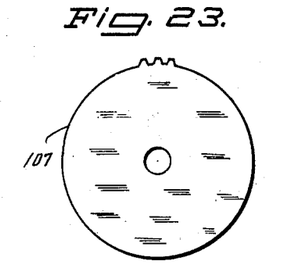
Fig. 23 is a face view of a wheel having several gear teeth thereon and being adapted to relatively control one total price wheel with respect to the other.

The numerals 93, 94, and 95 designate driving wheels that are substantially fixed, respectively, to the unit price wheels 38, 39, and 40, as shown in Fig. 20, each of the said driving wheels being provided with ten resilient fingers that are evenly spaced apart and marginally disposed at an oblique angle around the wheel, as shown in Fig. 16. The numeral 91A designates an idler shaft that is relatively arranged with respect to the unit price wheel and total price wheel shafts, as shown in Figs. 1 and 16. The three ratchet wheels 96, 97, and 98 each have ten ratchet teeth, preferably shaped as shown in Fig. 16, and are revolubly mounted on said shaft 91A and located thereon in positions that will cause them to engage, respectively, with the driving wheels 93, 94, and 95. The said ratchet wheels 96, 97, and 98 are provided, respectively, with gear wheels 99, 100, and 101 that are fixed thereon as shown in Fig. 21. The total price wheels 41, 42, 43, and 44 are provided, respectively, with gear wheels 102, 103, 104, and 105, and said gear wheels are fixed to the total price wheels, as shown in Fig. 22. In Fig. 23 there is illustrated a gear wheel having three gear teeth. This gear may have any suitable number of teeth, which will cause a gear of a corresponding size with a complete number of teeth to turn one-tenth of a revolution to each complete revolution of said gear shown in Fig. 23. Three gear wheels 106, 107, and 108, of the type shown in Fig. 23, are provided and fixed, respectively, to the total price wheels 41, 42, and 43. An idler gear 109 is revolubly mounted on the shaft 29, as shown in Fig. 21, and is adapted to engage with gears 108 and 105, shown in Fig. 22.

It will be noted that the unit price wheel 38 is connected to its corresponding total price wheel 41 by the driving wheel 93, ratchet wheel 96, and gears 99 and 102. Likewise, the unit price wheel 39 is connected to the total price wheel 42 by the drive wheel 94, ratchet wheel 97, and gears 100 and 103; and, furthermore, the unit price wheel 40 is connected to the total price wheel 43 by the drive wheel 95, ratchet wheel 98, and gears 101 and 104.

As hereinbefore stated, each unit price wheel and each total price wheel carries the numeral characters from naught to nine inclusive. It will be observed in Fig. 16 that the driving wheel, one of which is fixed to each unit price wheel, is divided into ten equal spacings by the spring fingers representing from naught to nine inclusive. Likewise the idler ratchet wheel is divided into ten equal spacings and is geared to the total price wheel. The wheels are thus revolved one-tenth of a turn to register each numeral, and each total price wheel is revolved simultaneously and in synchronism with its corresponding unit price wheel. It will thus be seen that if the unit price wheel 39, for example, were to be moved to a position where it would register the numeral 5, the said wheel would be revolved one-fifth of a revolution, and its corresponding total wheel 41 would be automatically revolved one-fifth of a revolution and will also register the numeral 5. The same relation exists between the other unit price wheels and their corresponding total price wheels to compute and total the amount of prices desired.

In the present device there are provided four total price wheels, two for dollars and two for cents, which will add up to $99.99. When a certain one of the total price wheels has been turned to the numeral 9 and it is desired to add more than 9 by the corresponding unit price wheel, it becomes necessary for that certain total price wheel to automatically operate the adjacent total price wheel in order to obtain an amount requiring an additional figure. Three gear wheels 106, 107, and 108, each being formed with gear teeth on one-tenth of their outer periphery, as shown in Fig. 23, are, therefore, provided and fixed, respectively, to the total price wheels 41, 42, and 43, as shown in Fig. 22. The said gear wheels 106, 107, and 108 are adapted to engage, respectively, with the idler gears 100, 101, and 109 and are fixed to their respective total price wheels with the gear teeth located in a position to mesh with their respective idler gears when the total price wheels are turned from 9 to 0. When any one of the said idler gears is thus engaged, it will be revolved one-tenth of a revolution, which will turn the corresponding gear on the adjacent total price wheel one-tenth of a revolution to a position where the next numeral will be in line to be printed.

Figure 24:
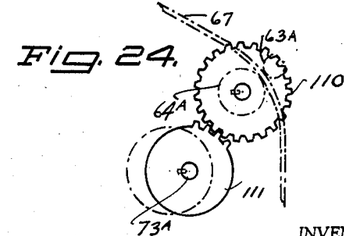
Fig. 24 is a view illustrating how the listing paper tape is moved and controlled by the eccentric wheel shaft.

Each time a sale is made and the handle 77A is revolved one revolution to record the amount of the sale on the listing paper ribbon 67, it is necessary to automatically move said paper upwardly a certain fixed distance to enable the amount of the next sale to be printed underneath the previous sale. In Fig. 24 there is illustrated the preferred construction for accomplishing this result, which consists in leading the paper ribbon 67 between two friction rollers 63A and 64A and in fixing a gear 110 on the shaft of the roller 64A and another gear 111 on the eccentric shaft 73. The said gear 111 has a number of its teeth removed, as shown in Fig. 24, to cause it to engage with the roller gear intermittently and is positioned on the eccentric shaft 73 in such relation to the eccentrics thereon as will enable it to engage the roller shaft gear 110 only after the eccentrics have pressed the listing paper and the recording ribbon against the price wheels and thus move the listing paper only when it is completely free from the price wheels. The paper is thus automatically moved to its next printing position after each recording has been made.

Figures 12, 13, 14, 15:
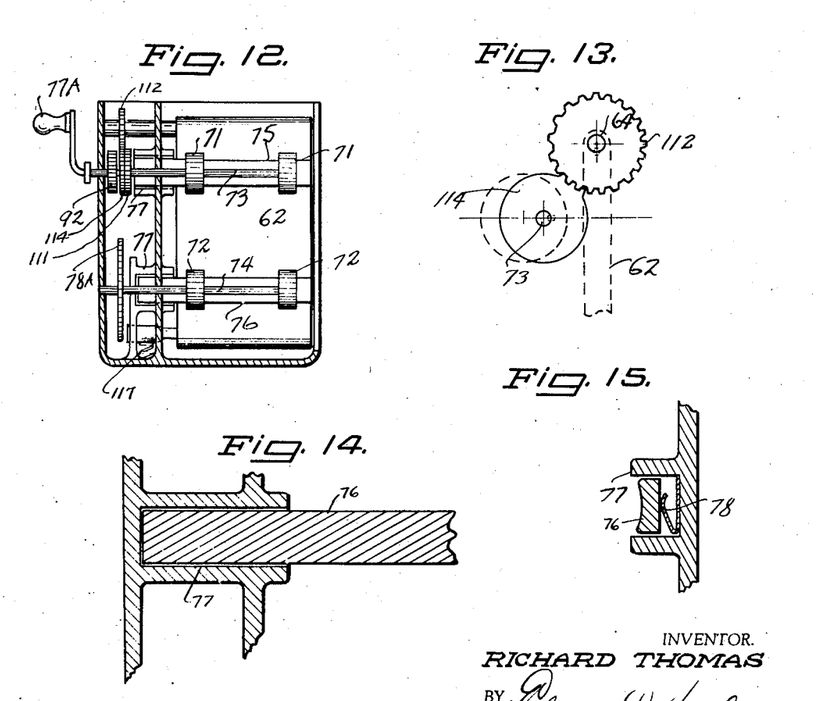
Fig. 12 is a vertical transverse sectional view taken on the line 12—12 of Fig. 1, looking in the direction of the arrows, the listing paper being removed.
Fig. 13 is an enlarged view, illustrating how the recording ribbon band is vertically moved by the eccentric shaft that presses the ribbon against the price wheels.
Fig. 14 is an enlarged fragmentary sectional view of one of the bars that is provided between the listing paper and eccentrics and also shows a guide that is provided to support the bar.
Fig. 15 is an end sectional view of the bar and guide shown in Fig. 14 and also shows a spring that is provided to resiliently hold the bar away from the paper and against the eccentrics.

Likewise, it is necessary to automatically move the recording ribbon to enable its entire surface to be used. A gear 112 is, therefore, provided and fixed onto the upper ribbon shaft 63, and another gear 114, having a number of its teeth removed as shown in Fig. 13, is provided and fixed onto the eccentric shaft 73 and is also positioned thereon in such relation to the eccentrics as will cause it to engage with the recording ribbon shaft gear 112 only after the eccentrics have pressed the ribbon against the price wheels, thus imparting movement to the ribbon only when it is completely free from the price wheels.

Figure 2:
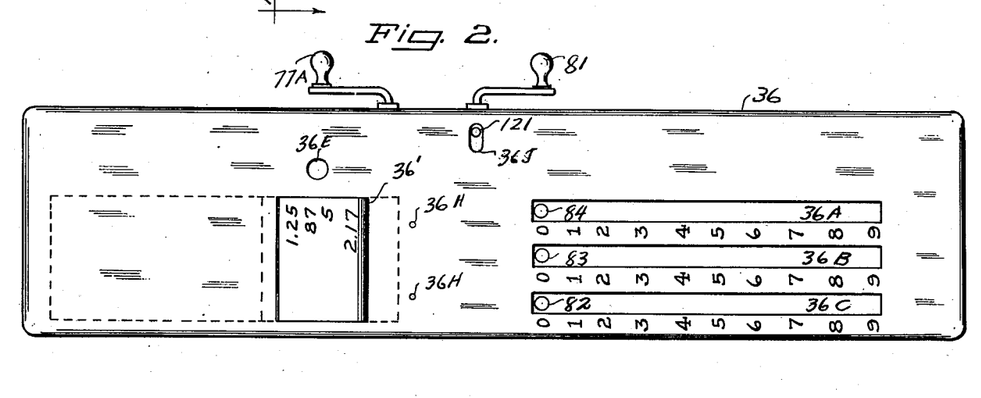
Fig. 2 is an enlarged top plan view of the device, showing the operating handles that extend through the right side of the casing and the slots that are provided through the top of the casing cover and the numerals at the side of said slots to indicate to the operator the price of any sale or sales that the operator desires to list.

It is desirable to resiliently hold the recording ribbon band tightly on its shafts when the device is in operation and to have simple means to cause the ribbon band to become loose on its shafts whenever it is necessary to remove the same. The lower ribbon shaft 64 is revolubly mounted in a bearing that is formed at one end of a lever 115 that is pivotally supported into the walls of the casing 35 by a shaft 116, and the bearing end portion of said lever is resiliently held downwardly by a spring 117, as shown in Figs. 1 and 3. A round hole 36E is provided in the casing cover 36 to enable the operator of the device to press the spring end of the lever 115 downwardly with a lead pencil to raise the opposite end and thus loosen the ribbon band 62 on its shafts 63 and 64 whenever it is desired to change the ribbon. An opening 36G, of a sufficient size to permit the listing paper 67 and the recording ribbon 62 to be changed, is formed into the side of the casing, and a cover 118 for said opening is provided and connected to the casing or casing cover, as shown in Fig. 3. A plurality of holes 36H is provided through the top of the casing cover and located, as shown in Fig. 2, to allow for inking the recording ribbon.

Figure 30:
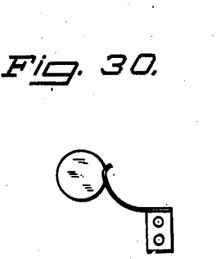
Fig. 30 is a view illustrating how the total wheel shafts are resiliently held in their normal position.
Figure 31:
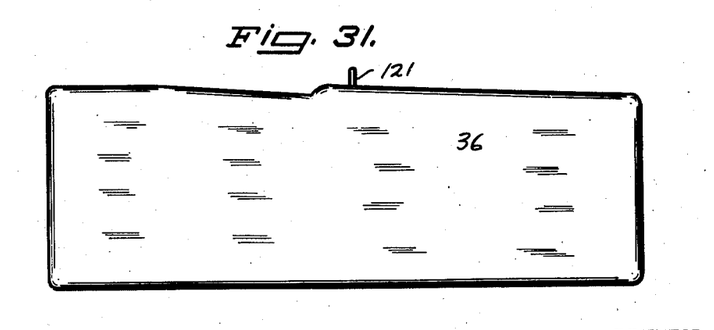
Fig. 31 is a side elevational view of the casing and illustrates the exact size of the device.

After a total sales price has been printed on the listing paper by turning the handle 81, it is necessary to retract the total price wheels back to their normal position. In order to simplify the operation, it is desirable to retract the said total price wheels by a continued turning of said handle 81. This is accomplished by providing a specially constructed clutch mechanism that is adapted to engage and disengage the shaft 80, upon which the handle 81 is fixed, with the total price wheel shaft 46. The ends of the said shafts are spaced apart by a coiled spring 119 that is applied against a disc 120, as shown in Fig. 10, said disc being substantially fixed to the shaft 80 in any suitable manner. A clutch lever 121 is provided, the lower end of which is pivotally connected to the casing 35 by being interposed between two pins 122 that are fixed into the shaft. The upper end of said lever projects through a slot 36J that is provided in the casing cover, as shown in Fig. 2. The ends of the shafts 80 and 46 are preferably formed with a tongue and groove construction, as shown in Fig. 10, but may have any other form that will provide a suitable clutch. When the shafts 80 and 46 are in their normal position, the shaft 80 is connected to the eccentric shaft 74 by the gears 78A and 79. (See Figs. 1, 10, and 12.) This enables the eccentric shaft to be turned to print the total sales price by turning the handle 81. As shown in Fig. 29, the total price wheels are free to turn on the shaft 46 in one direction to permit them to be independently revolved, but are all locked to said shaft with respect to turning in the opposite direction. When it is desired to retract the said total price wheels after a total sales price has been recorded, the top of the lever 121 is moved in the direction of the arrow A (Fig. 10) which disengages the gears 78A and 79 and connects the shafts 80 and 46 together, and the handle 81 is then turned in an anti-clockwise direction until the shaft catches in a spring catch, as shown in Fig. 30, and the total price wheels will then all be back in their normal position and ready for the next operation.

The numeral 123 designates a spring having one end secured to the bottom of the casing and its opposite free end capable of contacting and resiliently holding the total price wheel gears in the predetermined moved positions.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

An adding device of the character described for use in combination with a roll of record tape, comprising, a casing, means for revolubly supporting a roll of record tape therein, means for enabling the free end of the record tape to extend through the casing, means for holding a portion of the record tape in a position to be printed, a plurality of wheels revolubly mounted within the casing and arranged in juxtaposition to the record tape, a plurality of printing tapes individually fastened onto said wheels and adapted to be wound thereon and unwound therefrom, a recording ribbon in the form of an endless band positioned between the record tape and the wheels carrying the printing tapes, means for movably carrying the ribbon band between the casing, means including a ratchet bar and a plurality of ratchet pins for enabling the printing tapes to be manually moved from their normal positions to different printing positions, means including a spring for returning the printing tapes to their normal positions, and means including a manually operative eccentric member which, when turned to a certain position, presses the record tape against the ribbon band causing the record tape to be printed and when turned to another position releases the printing tapes, imparts movement to the ribbon band and moves the record tape to its next printing position automatically.

RICHARD THOMAS.